United States Patent [19]

Loper et al.

[11] Patent Number: 4,682,123

[45] Date of Patent: Jul. 21, 1987

[54] DIGITAL VOICE AND DATA FREQUENCY MODULATION CIRCUIT

[75] Inventors: Roger K. Loper, Norway; Richard A. Freeman, Cedar Rapids, both of Iowa

[73] Assignee: Rockwell International Corporation, El Segundo, Calif.

[21] Appl. No.: 873,241

[22] Filed: Jun. 11, 1986

[51] Int. Cl.$^4$ ............................................... H03C 3/00
[52] U.S. Cl. ................................. 332/16 R; 332/9 R; 332/21; 375/62; 455/110
[58] Field of Search ...................... 332/9 R, 9 T, 11 R, 332/11 D, 16 R, 16 T, 21; 375/44, 45, 62; 455/42, 110

[56] References Cited

U.S. PATENT DOCUMENTS 4,618,966  10/1986  Stepp et al. .................... 332/9 R X Primary Examiner—Siegfried H. Grimm Attorney, Agent, or Firm—M. Lee Murrah; V. Lawrence Sewell; H. Fredrick Hamann

[57] ABSTRACT

The bandwidth of frequency modulated signals is limited in a digital data transmission system by shaping the square digital waveform to form a trapezoidal shaped waveform having a positively-sloped ramp on the leading edge of the waveform and negatively-sloped ramp on the following edge of the waveform. Provisions are made to selectively determine the slope of the ramps and the amplitude of the waveform so that the system can be used with a wide range of data transmission speeds without resort to bandpass filter or component changes as were required in the prior art. Provision is also made for transmission of analog data in the same system by providing a feedback loop which causes the ramping to follow, and thus approximate, the analog waveform. The shaped data signal is fed to a frequency synthesizer which produces a frequency modulated sine wave whose frequency deviation is related to the magnitude of the digital or analog data signal.

18 Claims, 13 Drawing Figures

NO FILTERING

7-POLE FILTER

FIG 6D  *PRIOR ART*

TRAPEZOID

DIGITAL VOICE AND DATA FREQUENCY MODULATION CIRCUIT

BACKGROUND OF THE INVENTION

The invention relates to radio frequency modulators, and more particularly to modulators accommodating both digital and analog modulating signals, and most particularly to modulators which limit the bandwidth of transmitted signals.

There are many situations in which it is desirable to limit the bandwidth of a modulated carrier signal. In digital communications, for example, the square waveforms used to represent binary bits generate signal components far removed in frequency from the carrier signal. Not only is this wasteful, since such components are unnecessary to recover the digital information upon reception, but it is also likely to cause interference with signals on adjacent frequencies through signal "splatter". The bandwidth can also be limited for voice transmissions since a bandwidth of only 6 KHz is required for full intelligibility for AM signals. Other modes such as single sideband require less than half this bandwidth.

It is well known to use analog multi-pole filters to limit the bandwidth of such signals. However, such filters are complex and are subject variably from radio to radio due to differences in component values and from time to time due to environmental conditions. They are also fixed in frequency and bandwidth and thus are not suitable for radio transmitters which must accommodate a wide variety of data transmission rates, including both digital and analog information, which are possible with modern digitally synthesized exciters. Typically, a digitally synthesized exciter may be required to transmit signals at data rates in the range of 75 bps to 160,000 bps. If television data were to be transmitted, data rates of up to 4,000,000 bps would be encountered.

It is therefore an object of the present invention to provide an FM modulator which will accommodate a wide range of frequencies and transmission data rates.

It is another object of the present invention to provide an FM modulator which will provide digital premodulation bandpass filtration.

It is a further object of the present invention to provide an FM modulator which is compatible with digital synthesizers.

It is yet another object of the present invention to provide an FM modulator which is compatible with both digital and analog modulating signals.

It is yet a further object of the present invention to provide an FM modulator which is less complex than previous modulators using analog multi-pole bandpass premodulation filters.

It is still a further object of the present invention to provide an FM modulator which is less expensive than previous modulators using multi-pole bandpass premodulation filters.

SUMMARY OF THE INVENTION

With these and other objects in view, the present invention provides frequency modulation of a carrier signal in response to a data signal by using a clocked accumulator responsive to the rise and fall of the data signal. A slope value which is selectable to accommodate various data transmission rates is fed to the accumulator either without alteration or with its arithmetic sign reversed. The value of the accumulator is then used to drive a direct digital frequency synthesizer.

In the case of digital data, the present invention reshapes the square waveform with vertical rise and fall characteristics to ramped rise and fall characteristics which have lower levels of high frequency sine components, the elimination of which substantially reduces the bandwidth of the modulated carrier signal.

In the case of analog data, the present invention uses a feedback loop to compare the value of the accumulator to the instantaneous value of the analog signal. Depending upon the sign of the resultant signal, the accumulator generates either a positively or negatively sloped ramp which closely follows the analog signal amplitude.

BRIEF DESCRIPTION OF THE DRAWINGS

The invention may be more fully understood by reading the following description of a preferred embodiment of the invention in conjunction with the appended drawings wherein:

FIGS. 4A and 4B show a series of graphs of digital waveforms containing information, which may be transmitted by the transmitter of FIG. 1 in accordance with the present invention;

FIGS. 6A-6F show a series of graphs illustrating signals and their associated frequency spectra with and without premodulation filtering in accordance with prior art methods and with the present invention.

DETAILED DESCRIPTION OF A PREFERRED EMBODIMENT

Figure 1:
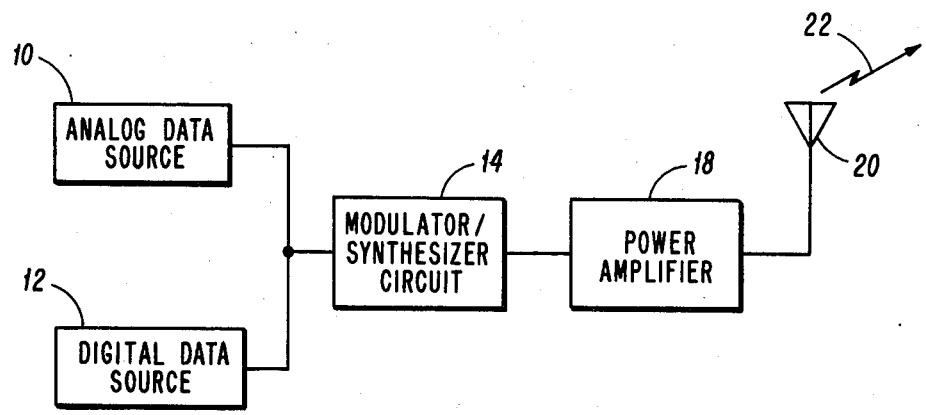
FIG. 1 is a generalized block diagram of a radio transmitter which may utilize the present invention.

An overall simplified block diagram of a radio transmitter employing the present invention is shown in FIG. 1. Although the invention is illustrated in use in connection with radio transmission, it should be emphasized that the invention is applicable to any device requiring bandwidth-limited modulation, such as wired telephony.

In general, either an analog data (such as voice) source 10 or a digital data source 12 is connected to the input of a modulator/synthesizer circuit 14, designed in accordance with the principles of the present invention and to be hereinafter described. The output of modulator/synthesizer circuit 14 is connected to the input of a power amplifier 18, whose output is in turn connected to an antenna, or the like, 20.

Figure 2:
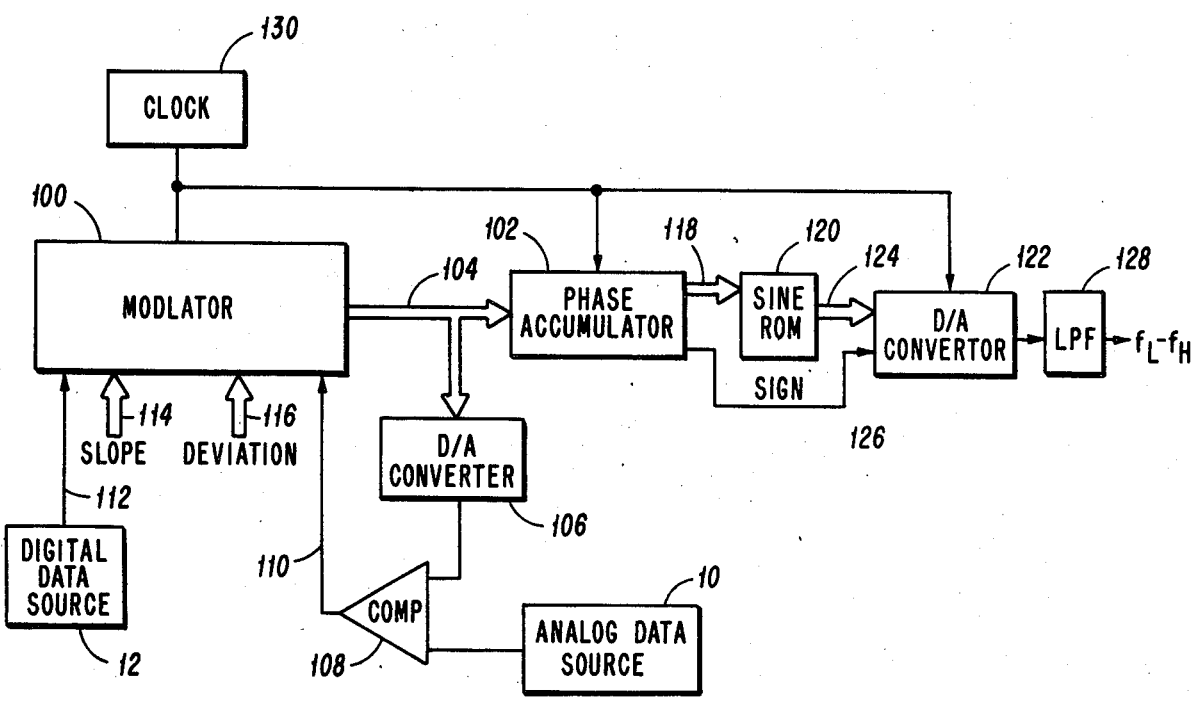
FIG. 2 is a block diagram of a direct digital synthesizer, modulator and associated circuitry in accordance with the present invention.

Referring next to FIG. 2, the combined circuitry of modulator/synthesizer 14 of FIG. 1 and associated circuitry are shown in greater detail. A modulator 100 is connected via a bus 104 to the input of a pipelined phase accumulator 102 and to the input of a D/A converter 106. The output of D/A converter 106 is connected to one input of a comparator 108. The other input of comparator 108 is connected to analog data source 10 as previously described. The output of comparator 108 is connected via line 110 to an input of modulator 100 to form a feedback loop.

Another input of modulator 100 is connected via line 112 to digital data source 12 as previously described. Modulator 100 also is connected via bus 114 to a source of SLOPE information and via a bus 116 to a source of DEVIATION information. The SLOPE information is a binary signal whose value is indicative of the slopes of ramps 30 and 34 in FIG. 4B to be hereinafter described. The DEVIATION information is also a binary signal whose value is indicative of the desired frequency deviation of the modulated signal.

One output of phase accumulator 102 is connected via bus 118 to a sine ROM 120. The output of sine ROM 120 is then connected to one input of a D/A converter 122 via a bus 124. A second output of accumulator 102 is also connected via a SIGN line 126 to a second input of D/A converter 122. The output of D/A converter 122 is connected to the input of a low pass filter (LPF), 128 the output of the latter of which is a signal whose frequency ranges between a lower frequency $f_l$ and an upper frequency $f_h$.

The output of a clock signal generator 130 is connected to the clock inputs of modulator 100, phase accumulator 102, and D/A converter 122.

Figure 3:
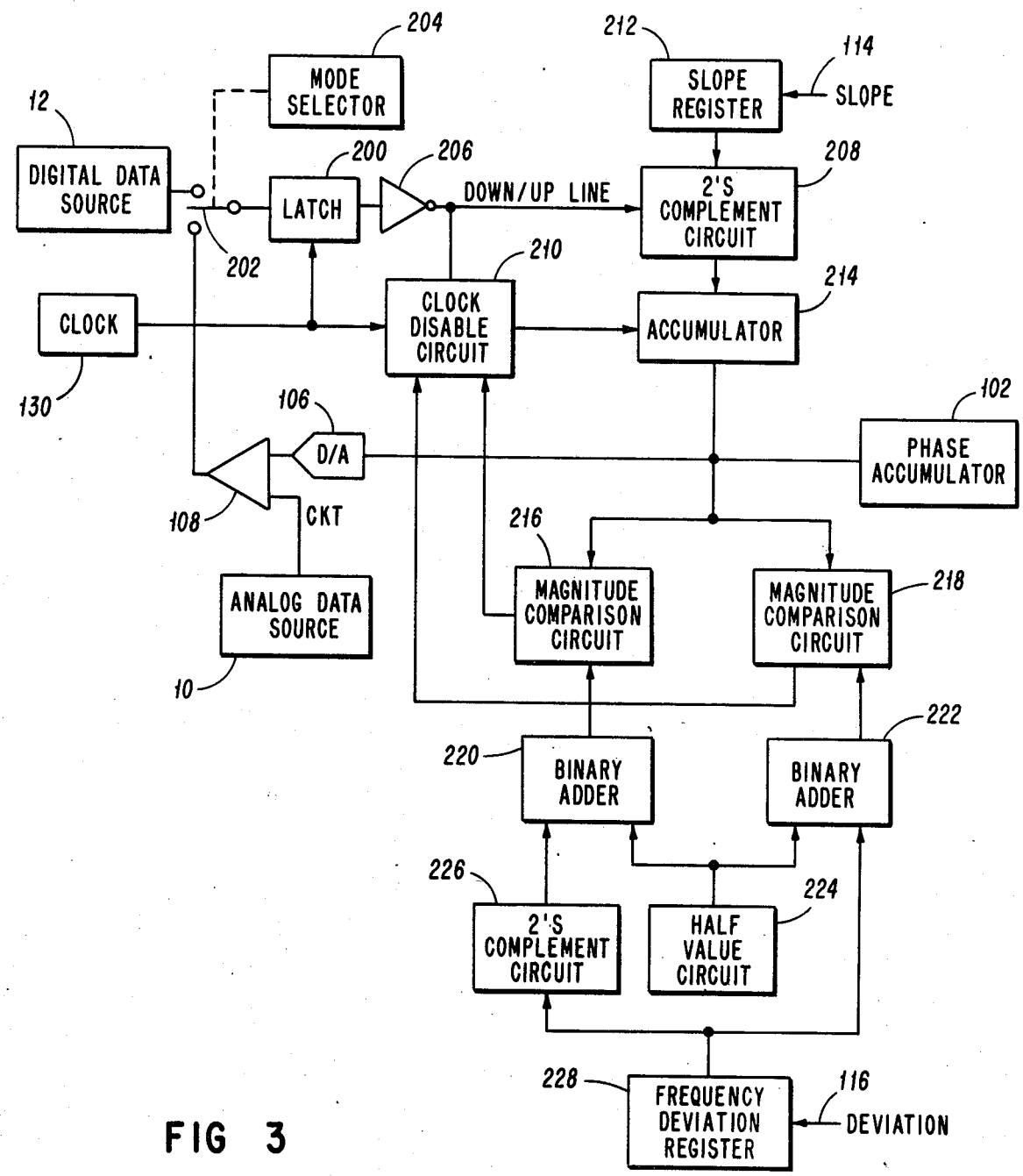
FIG. 3 is a block diagram of the modulator of FIG. 2 in accordance with the present invention.

Referring next to FIG. 3, modulator 100 and associated circuitry are shown in more detail. Digital data source 12 is connected to the input of a latch 200 through one terminal of a two-position switch 202. The second terminal of switch 202 is connected to comparator 108, D/A converter 106 and analog data source 10 in the manner described in connection with FIG. 2 above. The position of switch 202 is controlled by a mode selector 204, which permits selection of either analog data source 10 or digital data source 12.

The output of latch 200 is connected to the input of an inverter 206, whose output in turn is connected both to the first input of a 2's complement circuit 208 via a line labelled DOWN/UP LINE and a clock disable circuit 210. The 2's complement circuit 208 is also connected via a second input to the output of a slope register 212 whose contents are derived from the external SLOPE input via bus 114.

The output of 2's complement circuit 208 is connected to the first input of an accumulator 214, whose second input is connected to the output of clock disable circuit 210. The output of accumulator 214 is connected to D/A circuit 106 and phase accumulator 102 as previously described in connection with FIG. 2, and to one input each of the two magnitude comparison circuits 216 and 218. The outputs of the two magnitude comparison circuits are connected to clock disable circuit 210.

A second input of magnitude comparison circuit 216 is connected to the output of a binary adder 220. Similarly, a second input of magnitude comparison circuit 218 is connected to the output of a binary adder 222. One input of each of binary adders 220 and 222 is connected to the output of a half value circuit 224. A second input of binary adder 220 is connected to a 2's complement circuit 226, whose input is connected to the output of a frequency deviation register 228, whose contents are derived from external DEVIATION input via bus 116. The output of frequency deviation register 228 is also connected to a second input of binary adder 222.

OPERATION OF THE INVENTION

The operation may best be understood by first considering the waveforms to be operated upon by modulator/synthesizer 14 and transmitted by the radio transmitter described in connection with FIG. 1.

First, considering digital data, digital data source 12 may produce a waveform such as that shown in FIG. 4A. The waveform illustrated is an 8-bit serial word comprised of bits $m_0$–$m_7$, each of which has a uniform duration. Each bit interval has associated with it an amplitude value of either 0 or P which represent the binary values "0" and "1", respectively. Thus, the word illustrated in FIG. 4A has the binary value 10010110.

Figure 6A:
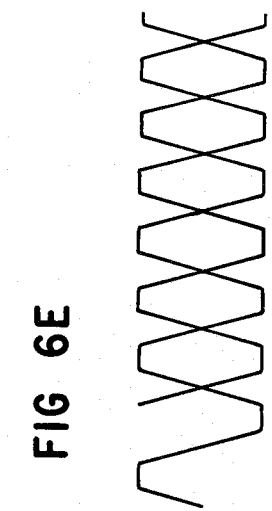

When several words of data such as that in FIG. 4A are superimposed as when they are viewed on an oscilloscope screen, the waveform shown in FIG. 6A is produced. This waveform represents the waveform prior to premodulation filtering either as previously practiced or in accordance with the present invention.

Figure 6E:
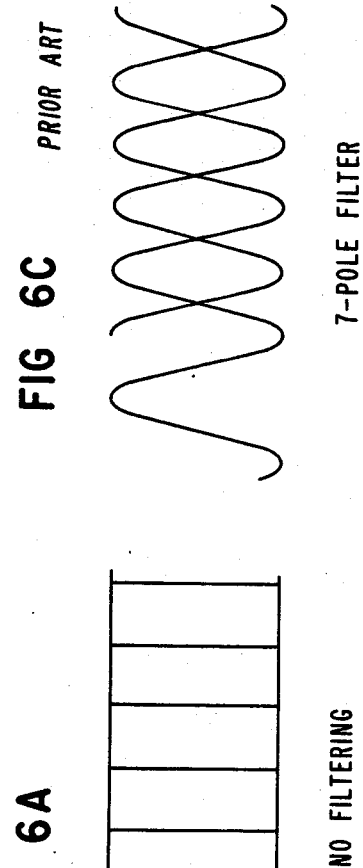
Figure 6E:
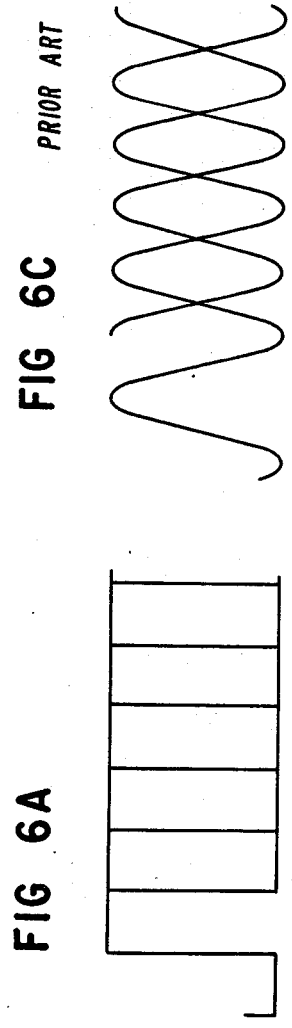
Figure 6B:
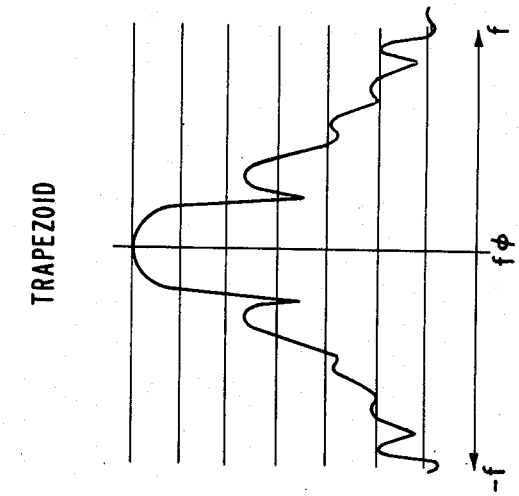

The frequency spectrum of a digital waveform such as that shown in FIG. 4A or 6A is shown in FIG. 6B. The horizontal axis of FIG. 6B (as well as those of FIGS. 6D and 6F) represents the frequency components centered about the carrier frequency $f_0$, and the vertical axis represents the amplitude of signal components at each frequency. Due to the fast rise and fall times of the waveform between amplitudes 0 and P, the frequency spectrum contains lobes far removed from the carrier frequency $f_0$. Although all these components are necessary to faithfully represent the square wave of FIGS. 4A and 6A, only the central components are necessary to convey the information contained in the signal. Thus, the frequency components far removed from $f_0$ can be removed by filtering or otherwise. In the prior art this was typically accomplished by applying the signal to a multi-pole bandpass filter. The filtered waveform and frequency spectrum for a 7 pole filter are shown in FIGS. 6C and 6D, respectively. As is apparent from comparison with FIG. 6B, the amplitude of the frequency components near $f_0$ are preserved, while that of the components further removed from $f_0$ are greatly attenuated. As would be expected, the fast rise and fall characteristics of the waveform of FIG. 6A have been eliminated by the filter, and the resulting waveform shown in FIG. 6C is nearly sinusoidal.

Figure 6F:
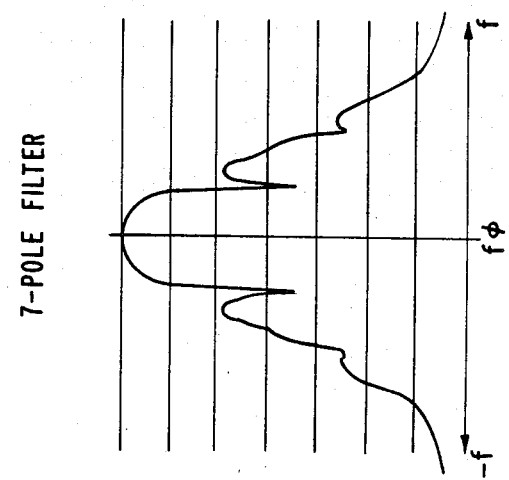
Figure 6F:
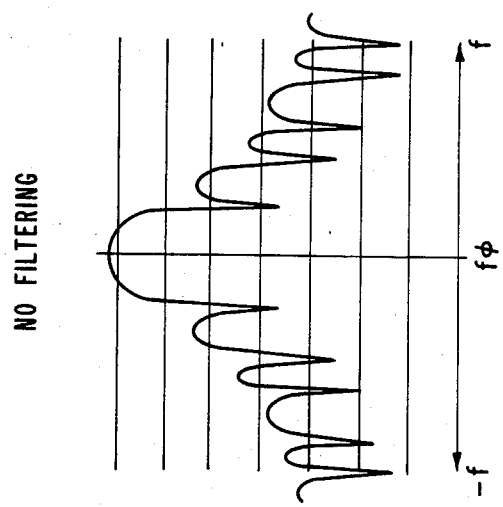

Returning to FIG. 4B, in accordance with the present invention, and instead of using a multi-pole bandpass filter, the data waveform 29 of FIG. 4B (reproduced in dotted form in FIG. 4B) may be shaped by the circuitry herein described to form a series of trapezoids which more closely approximate the rise and fall characteristics of ideal sinusoidal waveform. For example, the leading portion 30 of the $m_0$ is constrained to rise from 0 amplitude as a ramp until it reaches amplitude A at a point 32 which is approximately ⅔ of the duration of bit $m_0$. Likewise, the trailing portion 34 of bit $m_0$ is ramped down from amplitude P to 0 at a rate which brings it to the latter level approximately ⅔ of the duration of bit $m_1$. In a similar manner, all subsequent bits which represent binary 1's are ramped up and ramped down at the same rate. When several words of data are superimposed in the manner discussed in connection with FIGS. 6A and 6B, the trapezoidal waveform shown in FIG. 6E and the frequency plot shown in FIG. 6F are produced. When data rates are changed, the rate of rise and fall of ramps 30 and 34 are altered to conform to the ⅔ ratio.

Figure 4B:
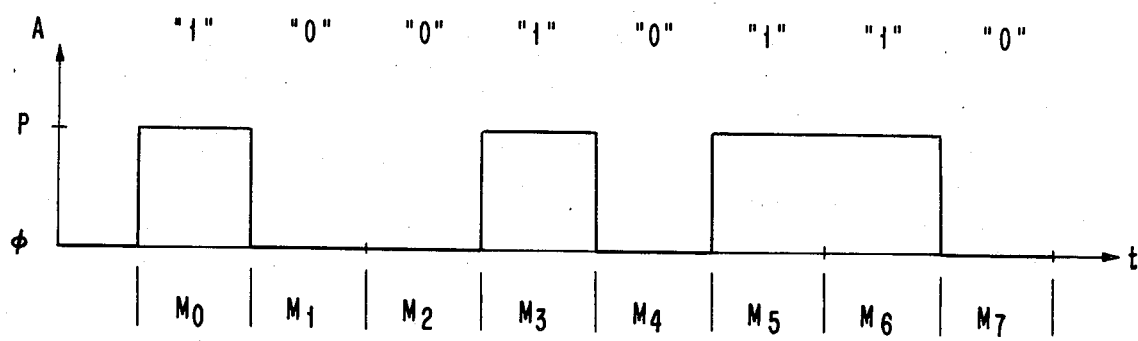
Figure 4B:
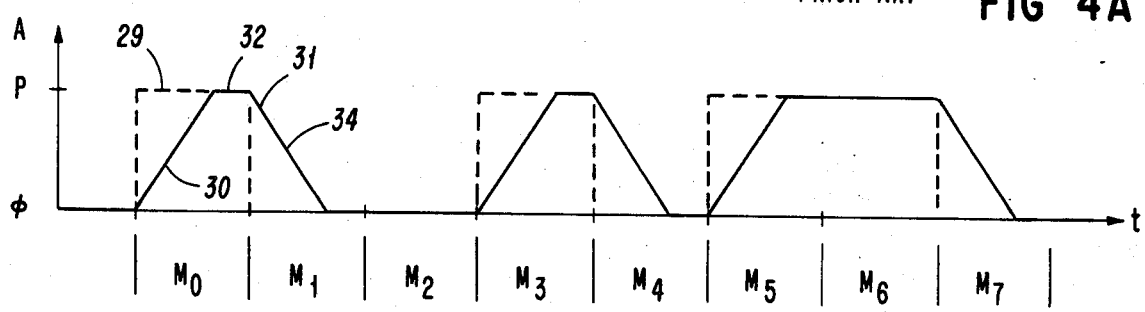

Although the ramped portions 30 and 34 are illustrated in FIG. 4B as continuous straight lines, it should be understood that they are produced using digital methods which result in "stairstepped" levels which approximate a straight line. This is illustrated (and greatly exaggerated) in FIG. 5A which shows the original square wave 29 in dotted line and the shaped wave 31 with stairstepped leading portion 30 and trailing portion 34. The point 32 at which leading portion 30 attains the amplitude P, is as previously stated preferably ⅔ of the time width of the original bit 29. In other words, the distance indicated by the numeral 36 is preferably twice the length of the distance indicated by the numeral 38.

Since the stepped ramping merely approximates the ideal sine wave, there are still components in the frequency plot of FIG. 6H which are far removed from carrier frequency $f_0$. However, the amplitudes are greatly attenuated and indeed the result simulates the degree of filtration obtained using fixed multi-pole filters as shown in FIG. 6D. However, passage of the signal through the phase-locked-loop (PLL) of the direct digital synthesizer as hereinafter described provides further filtering toward the results obtained with multi-pole filters.

Figure 5A:
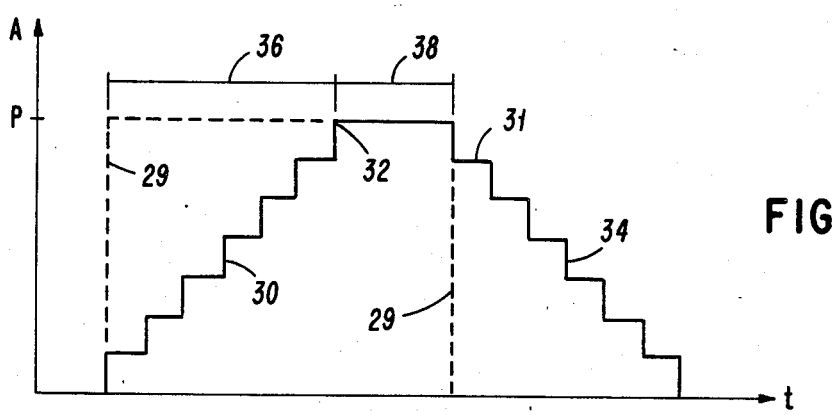
FIGS. 5A and 5B show a series of graphs illustrating the manner in which the present invention shapes digital signals and approximates analog signals.
Figure 5B:
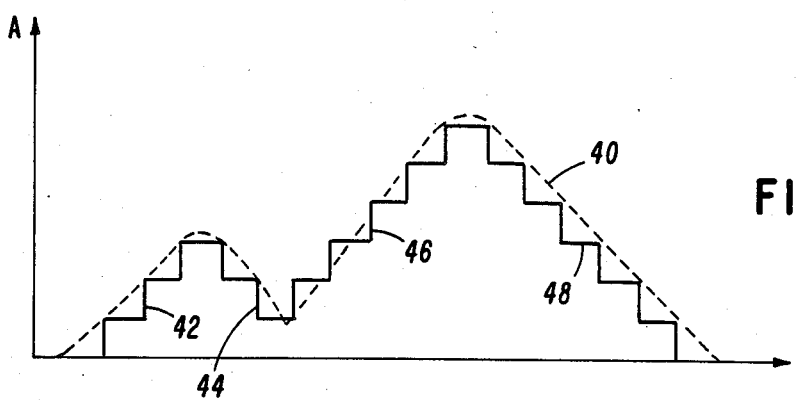

Next, considering analog waveforms, the stepped ramping function illustrated by ramps 30 and 34 in FIG. 5A can be used to digitize and approximate the analog waveform as illustrated in FIG. 5B. The original analog waveform 40 is followed by ascending and descending stepped portions each step of which represents the binary value of the waveform amplitude at each step. In the example analog waveform shown, the steps ascend in portions 42 and 46 to follow the rising original waveform 40 and reverse themselves and descend in portions 44 and 48 to follow the original waveform 40 as it falls in value. It should be borne in mind that the steps shown in FIG. 5B (as well as those in 5A) are much coarser than actually practiced in order to illustrate the idea. In reality a much larger number of steps, or digital samples are taken so that the original waveform 40 is much more closely approximated.

Now referring to the actual circuit operation, information to be transmitted may be derived either from an analog data source 10, such as voice information from a microphone, or a digital data source 12. Signals from either source 10 and or source 12 are passed to modulator/synthesizer circuit 14 which produces a frequency modulated signal whose frequency is related to the level of the analog or digital modulating signal. The FM signal produced by modulator/synthesizer circuit 14 may be amplified by power amplifier 18 and then directed to an antenna 20 where the signal is radiated via an electromagnetic wave 22.

Referring to the more detailed depiction of modulator/synthesizer circuit 14 and related circuitry in FIG. 2, clock 130 provides a clock signal to operate modulator 100, phase accumulator 102, and D/A converter 122. In the case of digital information, the digital signal is supplied by digital data source 12 via line 112 to modulator 100. Modulator 100 ramps up in steps to preset amplitude P on the rising edge of each binary data bit and ramps down in steps to amplitude 0 on the trailing edge of each data bit as illustrated in FIG. 5A. The slope of the ramps 30 and 34 are determined by the SLOPE value provided to modulator 100 via bus 114. The maximum level which the ramps attain is determined by the DEVIATION value provided to modulator 100 via bus 116.

In the case of analog information, the analog signal is provided by analog signal source 10 and is fed into a feedback control loop comprising comparator 108, modulator 100, and D/A converter 106. In this loop the digitized output of modulator 100 is fed to D/A converter 106, and the resulting analog signal is fed to comparator 108 where it is compared to the signal from analog source 10. The result is that the digital output of modulator 100 on bus 104 follows the signal provided by analog source 10.

The successive binary words produced by modulator 100 are accumulated in phase accumulator 102, and the result is passed to sine ROM 120 which contains a lookup table as to the amplitude of a sine wave corresponding to the value in accumulator 102. The series of binary values representing the frequency modulated sine wave are passed to D/A converter 122 to produce a continuous analog sine wave whose frequency varies between $f_l$ and $f_h$. The SIGN line 126 is provided since the first and last 180 degrees of a sine wave are identical except for the sign. Thus, the complete sine wave can be reproduced with 180 degrees of sine wave values plus the sign value.

Referring to FIG. 3 for a detailed description of the operation of modulator 100 and associated circuitry, mode selector 204 is used to determine whether digital or analog data is to be transmitted. The signal to be transmitted is passed to a latch 200 which holds the instantaneous value of the signal at each cycle of clock 130. The output of latch 200 is inverted by inverter 206 and passed to 2's complement circuit 208 via the DOWN/UP line. The 2's complement circuit 208 controls the passage of the binary word in slope register 212, which can be set either manually or electronically via SLOPE input line 114, to accumulator 214. If the DOWN/UP line is positive the slope register value is passed to accumulator 214 without alteration. However, if the DOWN/UP line is negative, then 2's complement circuit 208 generates the 2's complement of the value in slope register 212 and passes that to accumulator 214. As is well known, the effect of taking the 2's complement is to reverse the sign of the value of the slope register and to effect a subtraction rather than an addition in accumulator 214.

The output of accumulator 214 is passed to phase accumulator 102. However, the valve of the output of accumulator 214 is affected by a feedback loop having two branches. If mode selector 204 is set for analog data, the output of accumulator 214 is passed to D/A converter 106 and is processed as previously described in connection with FIG. 2. Regardless of the setting of mode selector switch 204, the output of accumulator 214 is passed to magnitude comparators 216 and 218, whose purpose along with the associated circuitry is to limit the upper and lower output values of accumulator 214.

This is accomplished by inputting a DEVIATION value via line 116 into frequency deviation register 228 and passing that value directly to a binary adder 222, and passing the negative of the value produced by 2's complement circuit 226 to binary adder 220. Binary adder 222 adds the value provided by frequency deviation register 228 to a value representative of one-half the difference between the desired upper and lower values of the output of accumulator 214, which is provided by half value circuit 224. Binary adder 220 adds the value provided by half value circuit 224 to the value provided by frequency deviation register 228 as negatived by 2's complement circuit 226.

The output of binary adder 222 thus represents the upper value limit of accumulator 214, and the output of binary adder 220 represents its lower value. The upper value from binary adder 222 is provided to magnitude comparison circuit 218 which compares the value with the output of accumulator 214. If the output of accumulator 214 is equal to or exceeds the value in binary adder 222, then a signal is sent to clock disable circuit 210 which disconnects the clock signal from accumulator 214 and thus inhibits further increases in the accumulator output value. Likewise the lower value from binary adder 220 is provided to magnitude comparison circuit 216 which compares the value with the output of accumulator 214. If the output of accumulator 214 is equal to or below the value in binary adder 220, then a signal is sent to clock disable circuit 210 to inhibit further decreases in the accumulator output value. The logic of clock disable circuit 210 is such that if the sign of the DOWN/UP line changes, then the clock disable circuit is reset and the accumulator can again begin operation.

While particular embodiments of the invention have been shown and described, it is obvious that minor changes and modifications may be made therein without departing from the true scope and spirit of the invention. It is the intention in the appended claims to cover all such changes and modifications.

We claim:

1. A circuit for generating a frequency modulated signal from information contained in a data signal, comprising;
    means for generating a clock signal;
    means responsive to the clock signal for repetitively accumulating an inputted value;
    means for detecting an increase in amplitude of the data signal;
    first means responsive to detection of the increase in amplitude of said data signal for inputting a first value to the accumulating means;
    means for detecting a decrease in amplitude of said data signal;
    second means responsive to detection of the decrease in amplitude of said data signal for inputting a second value to said accumulating means; and
    digital frequency synthesizer means for producing said frequency modulated signal responsive to said accumulating means.

2. A circuit in accordance with claim 1 further including:
    first means for comparing the value in said accumulating means to a first predetermined value; and
    means responsive to the first comparing means for disabling said accumulating means when said values are substantially equal.

3. A circuit in accordance with claim 2 further including:
    second means for comparing the value in said accumulating means to a second predetermined value; and
    means responsive to the second comparing means for disabling said accumulating means when said values are substantially equal 4. A circuit in accordance with claim 3 wherein:
    said first predetermined value is a maximum value and said disabling means prevents the value in said accumulating means from exceeding said maximum value; and
    said second predetermined value is a minimum value and said disabling means prevents the value in said accumulating means from subceeding said minimum value.

5. A circuit in accordance with claim 4 wherein said second value inputting into said accumulating means is the negative of said first value.

6. A circuit in accordance with claim 5 wherein said second inputting means comprises a two's complement circuit.

7. A circuit in accordance with claim 6 wherein:
    said data signal may be either analog or digital; and
    said circuit further includes means for selecting either the analog or digital signal.

8. A circuit in accordance with claim 7 further including:
    means for comparing the value in said accumulator to the instantaneous amplitude of said analog signal when said analog signal is selected, to produce a difference signal; and
    means for applying a signal related to the difference signal preduced by the comparing means to said accumulating means.

9. A frequency modulator for digital data, comprising;
    an accumulator;
    first means for selectively providing a positive predetermined value to the accumulator;
    second means for selectively providing a negative predetermined value to said accumulator;
    first means for detecting the start of a bit in the digital data;
    means for gating the positive predetermined value to the accumulator from the start of the data bit until said accumulator reaches a predetermined maximum value;
    means for detecting the end of said bit in the digital data;
    means for gating the negative predetermined value to said accumulator from the end of said data bit until said accumulator value reaches a predetermined minimum value; and
    a direct digital synthesizer responsive to said accumulator value for producing a frequency modulated output signal.

10. A frequency modulator for digital data in accordance with claim 9 wherein said means for gating positive predetermined value to the accumulator comprises:
    means for providing a clock signal to said accumulator;
    means for providing a predetermined maximum value;
    means for comparing said maximum value to said accumulator value;
    means for disabling said clock signal providing means when said accumulator value reaches said predetermined maximum value.

11. A frequency modulator for digital data in accordance with claim 10 wherein said means for gating said negative predetermined value to the accumulator comprises:
    means for providing a predetermined minimum value;
    means for comparing said minimum value to said accumulator value;
    means for disabling said clock signal providing means when said accumulator value reaches said predetermined minimum value.

12. A frequency modulator for digital data in accordance with claim 11 further including means for reenabling said clock when the start of another data bit is detected.

13. A frequency modulator for digital data in accordance with claim 12 wherein said means for providing a predetermined maximum value comprises:
   means for selectively providing a predetermined value related to the desired frequency deviation;
   means for selectively providing a value related to the desired center frequency value; and
   means for adding said frequency deviation related value to said center frequency related value.

14. A frequency modulator for digital data in accordance with claim 13 wherein said means for providing a predetermined minimum value comprises:
   means for generating the negative of said frequency deviation related value; and
   means for adding said negative frequency deviation related value to said center frequency related value.

15. A frequency modulator for digital data in accordance with claim 14 wherein said second providing means provides a value whose absolute value is equal to the value produced by said first providing means.

16. A frequency modulator for digital data in accordance with claim 15 wherein said second providing means comprises means for generating the two's complement of said positive predetermined value.

17. In a frequency modulation system:
   means for providing a data signal;
   means for selectively providing a slope value;
   first means for providing a signal indicative of an increase in the amplitude of the data signal;
   second means for providing a signal indicative of a decrease in the amplitude of said data signal;
   means for accumulating the slope value responsive to said first means and accumulating the negative of said slope value responsive to said second means;
   means for disabling the accumulating means when the accumulated value exceeds a predetermined maximum level or subceeds a predetermined minimum value; and
   means for generating a signal whose frequency is dependent upon the value in the accumulating means.

18. A frequency modulator for either digital or analog data, comprising:
   means for selectively switching between sources of analog and digital data signals;
   a latch for holding the instantaneous value of the selected signal;
   an accumulator;
   a register for holding a selectively-determined slope value;
   means for generating the two's complement of the slope value;
   means for feeding the slope value to said accumulator when the amplitude of said selected signal is increasing;
   means for feeding the two's complement of said slope value to said accumulator when the amplitude of said selected signal is decreasing;
   means for selectively providing a value related to the maximum desired value in said accumulator;
   means for selectively providing a value related to the minimum desired value in said accumulator;
   means for comparing the value in said accumulator to the minimum and maximum desired values;
   means for disabling said accumulator if the value therein falls outside the range defined by said minimum and maximum values;
   means for comparing the value in said accumulator to the instantaneous value of the analog signal to generate a difference signal; and
   means for providing a signal related to the difference signal to the latch when said analog signal is selected.

* * * * *